(12) United States Patent
Cho et al.

(10) Patent No.: US 11,634,182 B2
(45) Date of Patent: Apr. 25, 2023

(54) VEHICLE FRONT STRUCTURE

(71) Applicants: HYUNDAI MOTOR COMPANY, Seoul (KR); KIA CORPORATION, Seoul (KR)

(72) Inventors: Yun A Cho, Suwon-si (KR); Il Do Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 109 days.

(21) Appl. No.: 17/323,795

(22) Filed: May 18, 2021

(65) Prior Publication Data

US 2022/0126924 A1    Apr. 28, 2022

(30) Foreign Application Priority Data

Oct. 26, 2020   (KR) .................. 10-2020-0139592

(51) Int. Cl.
*B62D 25/08*    (2006.01)

(52) U.S. Cl.
CPC ......... *B62D 25/088* (2013.01); *B62D 25/081* (2013.01); *B62D 25/082* (2013.01)

(58) Field of Classification Search
CPC .... B62D 25/08; B62D 25/088; B62D 25/081; B62D 25/082; B60Y 2306/01; B60Y 2306/09
See application file for complete search history.

(56) References Cited

U.S. PATENT DOCUMENTS

| | | | | |
|---|---|---|---|---|
| 2017/0203793 | A1* | 7/2017 | Nakamura | B62D 25/088 |
| 2017/0369102 | A1* | 12/2017 | Kim | B62D 25/082 |
| 2019/0009830 | A1* | 1/2019 | Kondo | B60G 13/003 |
| 2020/0101914 | A1* | 4/2020 | Sakai | B62D 21/155 |
| 2020/0317274 | A1* | 10/2020 | Yoshida | B62D 25/088 |
| 2021/0309302 | A1* | 10/2021 | Hirai | B62D 25/082 |

FOREIGN PATENT DOCUMENTS

| | | | | |
|---|---|---|---|---|
| CN | 111731392 A | * | 10/2020 | ............ B62D 21/02 |
| DE | 102015223191 A1 | * | 2/2017 | ............ B60R 19/24 |
| DE | 102019001685 A1 | * | 10/2019 | ........... B60G 13/003 |
| JP | 3531491 B2 | * | 5/2004 | |
| WO | WO-2016120993 A1 | * | 8/2016 | |

* cited by examiner

*Primary Examiner* — Lori L Lyjak
(74) *Attorney, Agent, or Firm* — Lempia Summerfield Katz LLC

(57) ABSTRACT

A vehicle front structure includes: a pair of front side members disposed on the front of the vehicle; a pair of damper housings connected to the pair of front side members, respectively; and a connection member connecting the pair of front side members and the pair of damper housings.

12 Claims, 10 Drawing Sheets

VEHICLE FRONT STRUCTURE

CROSS-REFERENCE TO RELATED APPLICATION

This application is based on and claims the benefit of priority to Korean Patent Application No. 10-2020-0139592, filed on Oct. 26, 2020, in the Korean Intellectual Property Office, the disclosure of which is incorporated herein in its entirety by reference.

TECHNICAL FIELD

The present disclosure relates to a vehicle front structure, and more particularly, to a vehicle front structure capable of improving stiffness by providing a closed loop structure around a front compartment.

BACKGROUND

A vehicle includes a front compartment and a passenger compartment divided by a dash panel. A powertrain including a prime mover may be disposed in the front compartment. For example, the powertrain including an internal combustion engine may be disposed in the front compartment of an internal combustion engine vehicle, and the powertrain including an electric motor may be disposed in the front compartment of an electric vehicle.

The front compartment may be defined by a vehicle front structure. The vehicle front structure includes a front end module, a pair of front side members connected to the front end module, a pair of fender apron members connected to the front end module, a pair of damper housings connected to the pair of front side members, and a dash panel. The front end module may provide an attachment structure for heat exchangers (a radiator, a condenser, etc.), lamps, and the like. The pair of front side members may be spaced apart from each other in a width direction of the vehicle, and the pair of fender apron members may support fenders located on left and right sides of the vehicle. Each damper housing may support a damper such as a shock absorber of a vehicle suspension system. Each damper housing may be disposed between the corresponding front side member and the corresponding fender apron member. A cowl may be attached to an upper end of the dash panel.

It is important to ensure stiffness of the vehicle front structure so that various components such as the powertrain and the heat exchangers disposed in the front compartment may be safely protected. If transverse stiffness to support a load transferred in the width direction (or lateral direction) of the vehicle is not sufficiently secured, vibration and noise may be generated when the load is transferred from the road surface to the passenger compartment through the vehicle front structure. In other words, noise, vibration, and harshness (NVH) performance may deteriorate while the vehicle is driving. In addition, when the load is transferred to the passenger compartment through the vehicle front structure, each damper housing may rotate left and right on a vertical axis of the vehicle. In particular, the pair of damper housings may rotate independently of each other by the load, thereby reducing steering response. For example, in a luxury vehicle with a long hood, the front compartment is relatively long, and the tires are relatively close to the front of the vehicle, so it is very important to ensure transverse stiffness.

In order to ensure the stiffness of the vehicle front structure, a pair of stiffness bars may be provided to connect between the pair of damper housings and the cowl. The pair of stiffness bars may be arranged symmetrically with respect to a central longitudinal axis of the vehicle, and each stiffness bar may extend diagonally.

In the vehicle front structure according to the related art, however, the pair of stiffness bars partially interfere with the front compartment, which may make the front compartment narrow.

In addition, the related art vehicle front structure may fail to sufficiently support the load transferred in the width direction of the vehicle with only the pair of stiffness bars. To overcome this, a method of filling a foam filler inside the cowl or of attaching a reinforcing material to the cowl has been proposed, but the stiffness of the vehicle front structure may not be sufficiently improved. In particular, as vibration or noise is transferred to the passenger compartment of the vehicle through the stiffness bars, passengers may be exposed to relatively excessive vibration or noise.

The above information described in this background section is provided to assist in understanding the background of the inventive concept, and may include any technical concept which is not considered as the prior art that is already known to those having ordinary skill in the art.

SUMMARY

The present disclosure has been made to solve the above-mentioned problems occurring in the prior art while advantages achieved by the prior art are maintained intact.

An aspect of the present disclosure provides a vehicle front structure capable of providing a closed loop structure around a front compartment by connecting a pair of front side members, a pair of damper housings, and a front subframe. Thus, transverse stiffness may be improved.

According to an aspect of the present disclosure, a vehicle front structure may include: a pair of front side members disposed on the front of the vehicle; a pair of damper housings connected to the pair of front side members, respectively; and a connection member connecting the pair of front side members and the pair of damper housings.

The connection member may include: a crossmember extending in a width direction of the vehicle; and a pair of extension portions extending from the crossmember toward the pair of front side members, respectively.

Each damper housing may have a mounting cavity in which an end portion of the crossmember is received, and the end portion of the crossmember may be connected to the mounting cavity.

Each extension portion may extend diagonally from the crossmember toward a corresponding front side member.

Each extension portion may have a mounting surface connected to an inboard-side surface of a corresponding front side member.

The vehicle front structure may further include a front subframe disposed below the pair of front side members. The front subframe may have a pair of attachment arms connected to the pair of front side members, respectively, and each attachment arm may be aligned with a corresponding extension portion in a height direction of the vehicle.

The crossmember and each extension portion may have a closed transverse cross section.

The crossmember and each extension portion may have an I-shaped cross section.

The connection member may further include a plurality of first ribs attached to the crossmember and a plurality of second ribs attached to the extension portion.

The vehicle front structure may further include: a front end module located in front of the pair of damper housings;

and a pair of first stiffness bars connecting the pair of damper housings and the front end module.

The vehicle front structure may further include: a cowl located behind the pair of damper housings; and a pair of second stiffness bars connecting the pair of damper housings and the cowl.

The connection member may connect the pair of damper housings in a width direction of the vehicle. The connection member may also connect each damper housing and a corresponding front side member in a height direction of the vehicle.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
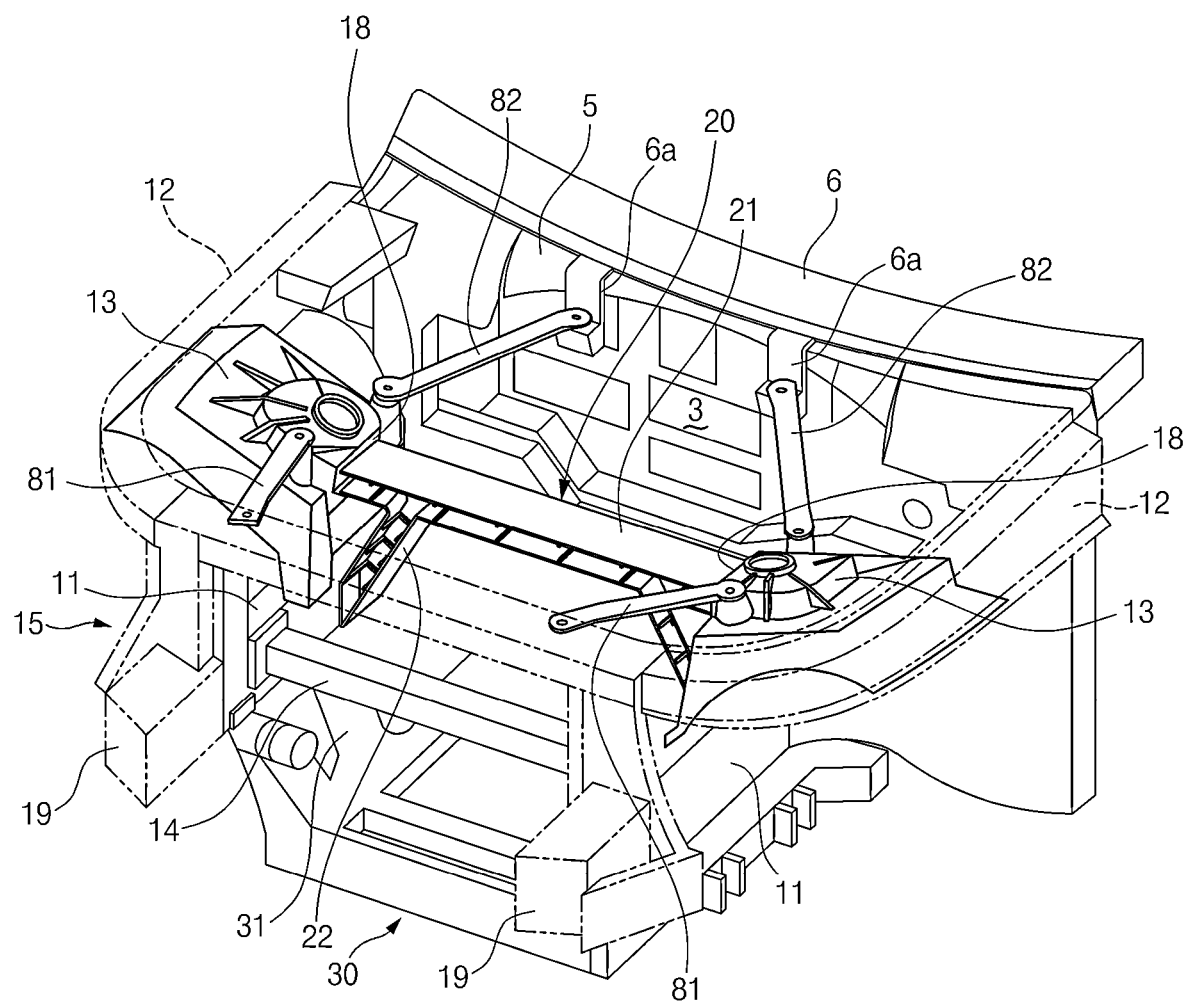
FIG. 1 illustrates a perspective view of a vehicle front structure according to an embodiment of the present disclosure.

Hereinafter, specific embodiments of the present disclosure are described in detail with reference to the accompanying drawings. In the drawings, the same reference numerals are used throughout to designate the same or equivalent elements. In addition, a detailed description of well-known techniques associated with the present disclosure has been omitted in order not to unnecessarily obscure the gist of the present disclosure.

Terms such as first, second, A, B, (a), and (b) may be used to describe the elements in specific embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those of ordinary skill in the field of art to which the present disclosure belongs. Such terms as those defined in a generally used dictionary should be interpreted as having meanings consistent with the contextual meanings in the relevant field of art. Such terms should not be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function.

Referring to FIG. 1, a vehicle front structure, according to an embodiment of the present disclosure, may include a pair of front side members 11, a pair of damper housings 13 connected to the pair of front side members 11, respectively, and a connection member 20 connecting the pair of front side members 11 and the pair of damper housings 13.

A grille (not shown) may be disposed on a front end of the vehicle, and a front end module 15 may be disposed behind the grille. The front end module 15 may provide an attachment structure for heat exchangers (a radiator, a condenser, etc.), lamps, and the like. A pair of crash boxes 19 may be attached to the front end module 15, and a front bumper (not shown) may be connected to the pair of crash boxes 19. Each crash box 19 may be aligned with the corresponding front side member 11 in a longitudinal direction of the vehicle. A pair of fender apron support members 12 may be connected to the front end module 15. The pair of fender apron support members 12 may be spaced apart from each other in a width direction of the vehicle. The fender apron support members 12 may extend from front pillars (not shown) attached to both sides of a dash panel 5 to end portions of the front end module 15, respectively. The dash panel 5 may divide a front compartment 3 from a passenger compartment 4. The vehicle front structure may include the front compartment 3 divided by the dash panel 5, and a cowl 6 may be mounted on an upper end of the dash panel 5. The front compartment 3 may be defined by the dash panel 5, the front end module 15, the fender apron support members 12, and the pair of front side members 11.

The pair of front side members 11 may be spaced apart from each other in the width direction of the vehicle. Each front side member 11 may extend in the longitudinal direction of the vehicle.

A front subframe 30 may be disposed below the pair of front side members 11. For example, the front subframe 30 may have a pair of front mounting portions (not shown) located on the front of the front subframe 30, a pair of central mounting portions (not shown) located in the center of the front subframe 30, and a pair of rear mounting portions (not shown) located on the rear of the front subframe 30. The front subframe 30 may be mounted to the pair of front side members 11 and/or relevant components through the pair of front mounting portions, the pair of central mounting portions, and the pair of rear mounting portions.

A front crossmember 14 may be disposed between the pair of front side members 11. The front crossmember 14 may extend in the width direction of the vehicle. Each end portion of the front crossmember 14 may be connected to the corresponding front side member 11 by using fasteners, welding, and/or the like. The front crossmember 14 may be horizontally aligned with respect to the front side members 11, and accordingly, the front crossmember 14 may be located above the front subframe 30.

The front end module 15, the pair of front side members 11, the pair of damper housings 13, the front subframe 30, and the dash panel 5 may define the front compartment 3, in which the powertrain, the heat exchangers, and the like may be received. The powertrain of an internal combustion engine vehicle may include an internal combustion engine, and the powertrain of an electric vehicle may include an electric motor and various electric/electronic components. The powertrain of the electric vehicle may also be referred to as a power electronics system.

Each damper housing 13 may be disposed between the corresponding front side member 11 and the corresponding fender apron support member 12. The pair of damper housings 13 may be spaced apart from each other and face each other in the width direction of the vehicle. An upper end portion of a damper such as a shock absorber of a front suspension system may be mounted to the damper housing 13. Each damper housing 13 may have a mounting cavity 18 facing a central longitudinal axis X of the vehicle. Accordingly, respective mounting cavities 18 of the pair of damper housings 13 may face each other.

Figure 3:
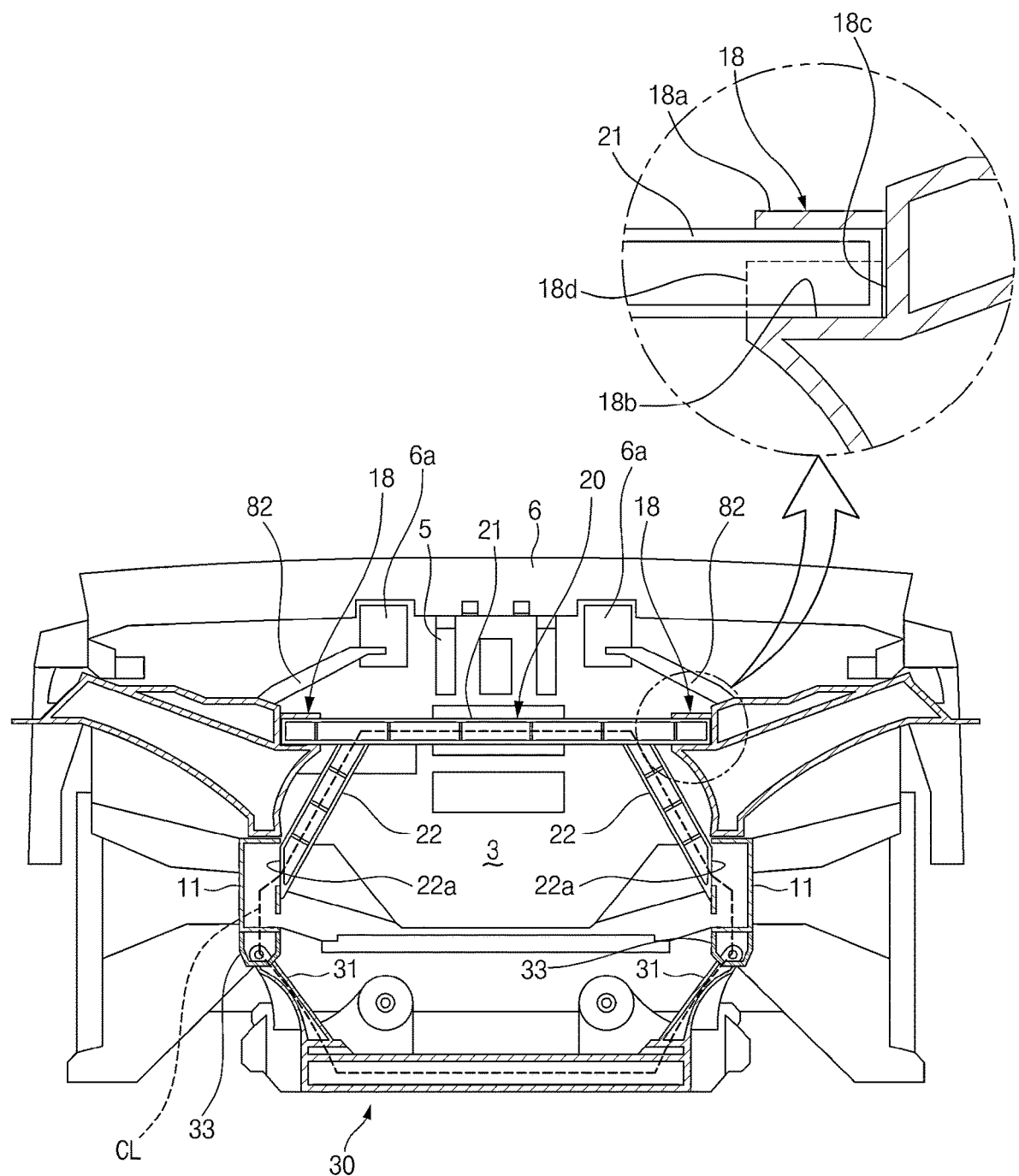
FIG. 3 illustrates a cross-sectional view, taken along line A-A of FIG. 2.

Referring to FIG. 3, the mounting cavity 18 may be provided at an interior-side edge of the damper housing 13. The damper housing 13 may have a top wall 18a, a bottom wall 18b, a first support wall 18c, and a second support wall 18d by which the mounting cavity 18 is defined. The top wall 18a may face the top of the vehicle, and the bottom wall 18b may oppose the top wall 18a. The first support wall 18c may be a flat wall perpendicular to a transverse axis of the vehicle. The second support wall 18d may be a flat wall perpendicular to a longitudinal axis of the vehicle.

Figure 4:
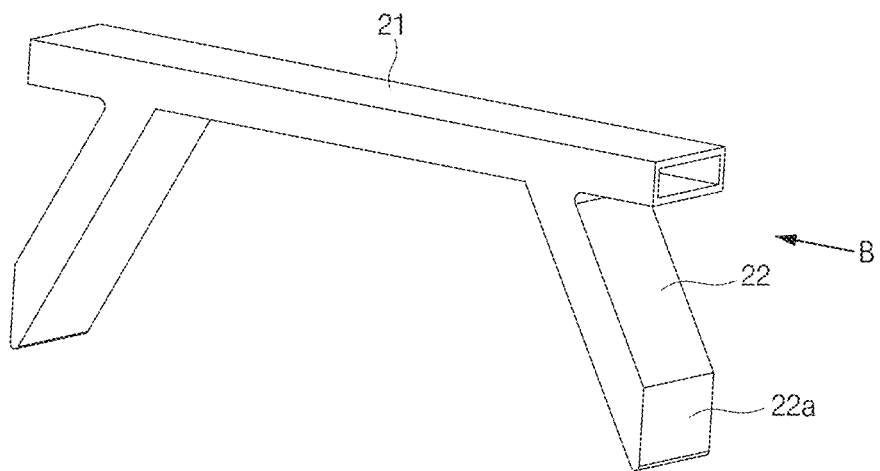
FIG. 4 illustrates a perspective view of a connection member according to an embodiment of the present disclosure.

Referring to FIG. 4, the connection member 20 may include a crossmember 21 and a pair of extension portions 22 extending from the crossmember 21 toward the pair of front side members 11, respectively. The crossmember 21 may extend in the width direction of the vehicle. Each extension portion 22 may extend diagonally from a portion of the crossmember 21 adjacent to an end portion of the crossmember 21.

Referring to FIG. 3, each end portion of the crossmember 21 may be received in the mounting cavity 18 of the corresponding damper housing 13. The end portion of the crossmember 21 may tightly contact the top wall 18a, the bottom wall 18b, the first support wall 18c, and the second support wall 18d of the mounting cavity 18. The end portions of the crossmember 21 may be connected to the mounting cavities 18 of the damper housings 13 by using fasteners, welding, and/or the like, respectively. Accordingly, the crossmember 21 may connect the pair of damper housings 13, and the crossmember 21 may be located in an upper portion of the front compartment 3. Each extension portion 22 may have a mounting surface 22a provided on a bottom end thereof. The mounting surface 22a of the extension portion 22 may be connected to an inboard-side surface of the corresponding front side member 11 by welding, using fasteners, and/or the like. According to an embodiment, each end portion of the crossmember 21 may be connected to the mounting cavity 18 of the damper housing 13 by bolting. The mounting surface 22a of each extension portion 22 may be connected to the corresponding front side member 11 by bolting.

Referring to FIG. 3, the front subframe 30 may have a pair of attachment arms 31 protruding toward the pair of front side members 11, respectively. An upper end of each attachment arm 31 may be connected to the corresponding front side member 11 through a bracket 33. Each attachment arm 31 of the front subframe 30 may be aligned with the corresponding extension portion 22 in a height direction of the vehicle. The mounting surface 22a of each extension portion 22 of the connection member 20 may be connected to the inboard-side surface of the corresponding front side member 11. Each attachment arm 31 of the front subframe 30 may be connected to a bottom surface of the corresponding front side member 11 through the bracket 33. Thus, the front subframe 30 may be connected to the connection member 20 through the front side member 11.

As described above, the crossmember 21 of the connection member 20 may connect the pair of damper housings 13 in the width direction of the vehicle. The extension portions 22 of the connection member 20 may connect the corresponding front side members 11 and the corresponding damper housings 13 in the height direction of the vehicle. The pair of front side members 11 may be connected by the front subframe 30 in the width direction of the vehicle. Thus, the pair of damper housings 13, the pair of front side members 11, the connection member 20, and the front subframe 30 may provide a closed loop structure CL within the front compartment 3.

According to an embodiment, the connection member 20 may be made of a lightweight material such as aluminum or an aluminum alloy. In particular, the connecting member 20 may be manufactured by an aluminum casting method so that the crossmember 21 and the pair of extension portions 22 may form a unitary one-piece structure. Since the crossmember 21 and the pair of extension portions 22 form the unitary one-piece structure, a load applied to the vehicle front structure may be uniformly distributed to the pair of damper housings 13, the pair of front side members 11, and the front subframe 30 through the connection member 20.

Figure 5:
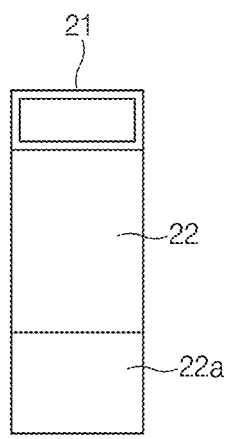
FIG. 5 illustrates a view which is viewed from a direction indicated by arrow B of FIG. 4.

According to an embodiment, as illustrated in FIGS. 4 and 5, the crossmember 21 and each extension portion 22 of the connection member 20 may have a closed transverse cross section. In FIG. 5, the closed transverse cross section of the crossmember 21 is illustrated as a rectangular cross section.

Figure 6:
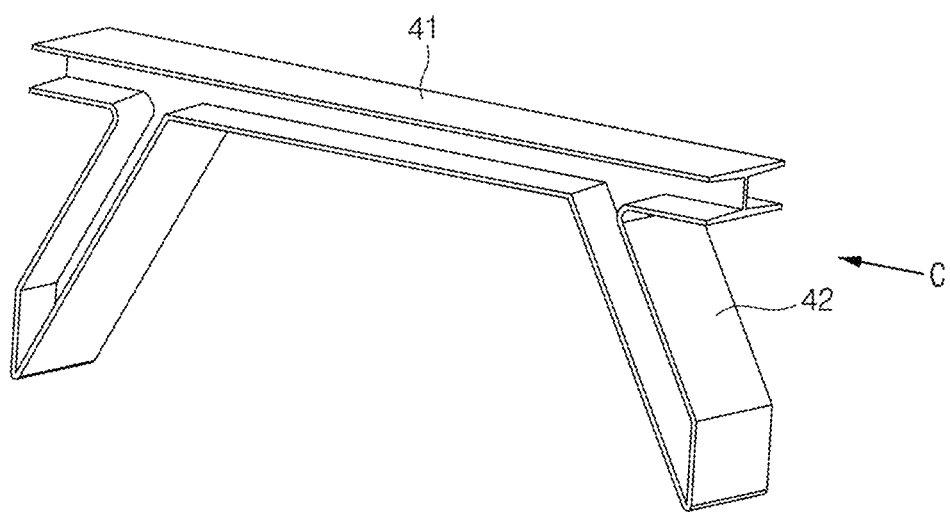
FIG. 6 illustrates a perspective view of a connection member according to another embodiment of the present disclosure.
Figure 7:
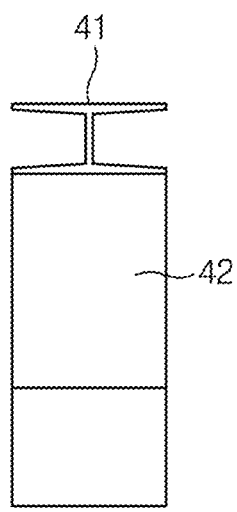
FIG. 7 illustrates a view which is viewed from a direction indicated by arrow C of FIG. 6.

According to another embodiment, as illustrated in FIGS. 6 and 7, a crossmember 41 and each extension portion 42 of a connection member 40 may have an I-shaped or H-shaped cross section.

Figure 8:
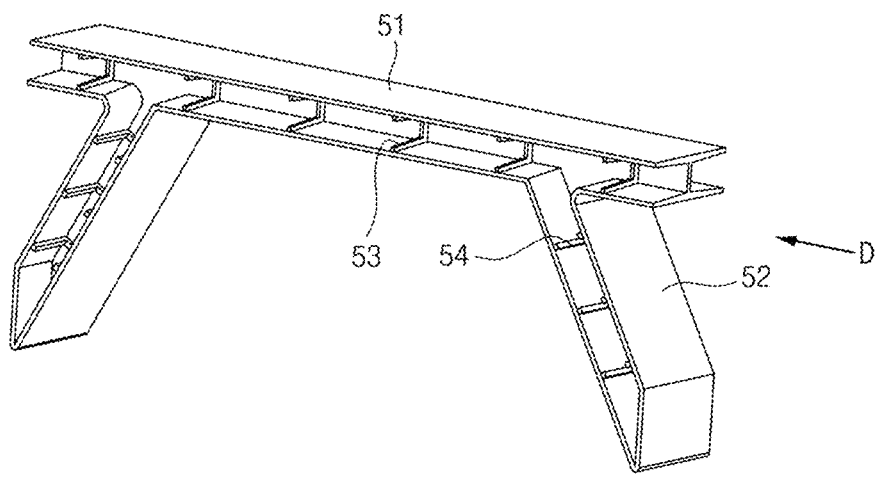
FIG. 8 illustrates a perspective view of a connection member according to another embodiment of the present disclosure.
Figure 9:
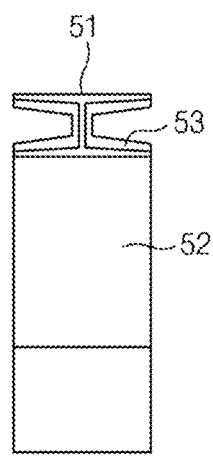
FIG. 9 illustrates a view which is viewed from a direction indicated by arrow D of FIG. 8.

According to another embodiment, as illustrated in FIGS. 8 and 9, a crossmember 51 and each extension portion 52 of a connection member 50 may have an I-shaped or H-shaped cross section. The connection member 50 may further include a plurality of first ribs 53 attached to the crossmember 51 and a plurality of second ribs 54 attached to the extension portion 52. The plurality of first ribs 53 may be spaced apart from each other in a longitudinal direction of the crossmember 51, thereby increasing stiffness of the crossmember 51. The plurality of second ribs 54 may be spaced apart from each other in a longitudinal direction of the extension portion 52, thereby increasing stiffness of the extension portion 52.

According to an embodiment of the present disclosure, the vehicle front structure may include a plurality of stiffness bars connected to the pair of damper housings 13, and each stiffness bar may extend in a diagonal direction. Thus, the stiffness (longitudinal stiffness and transverse stiffness) of the vehicle front structure may be increased by the plurality of stiffness bars.

Figure 2:
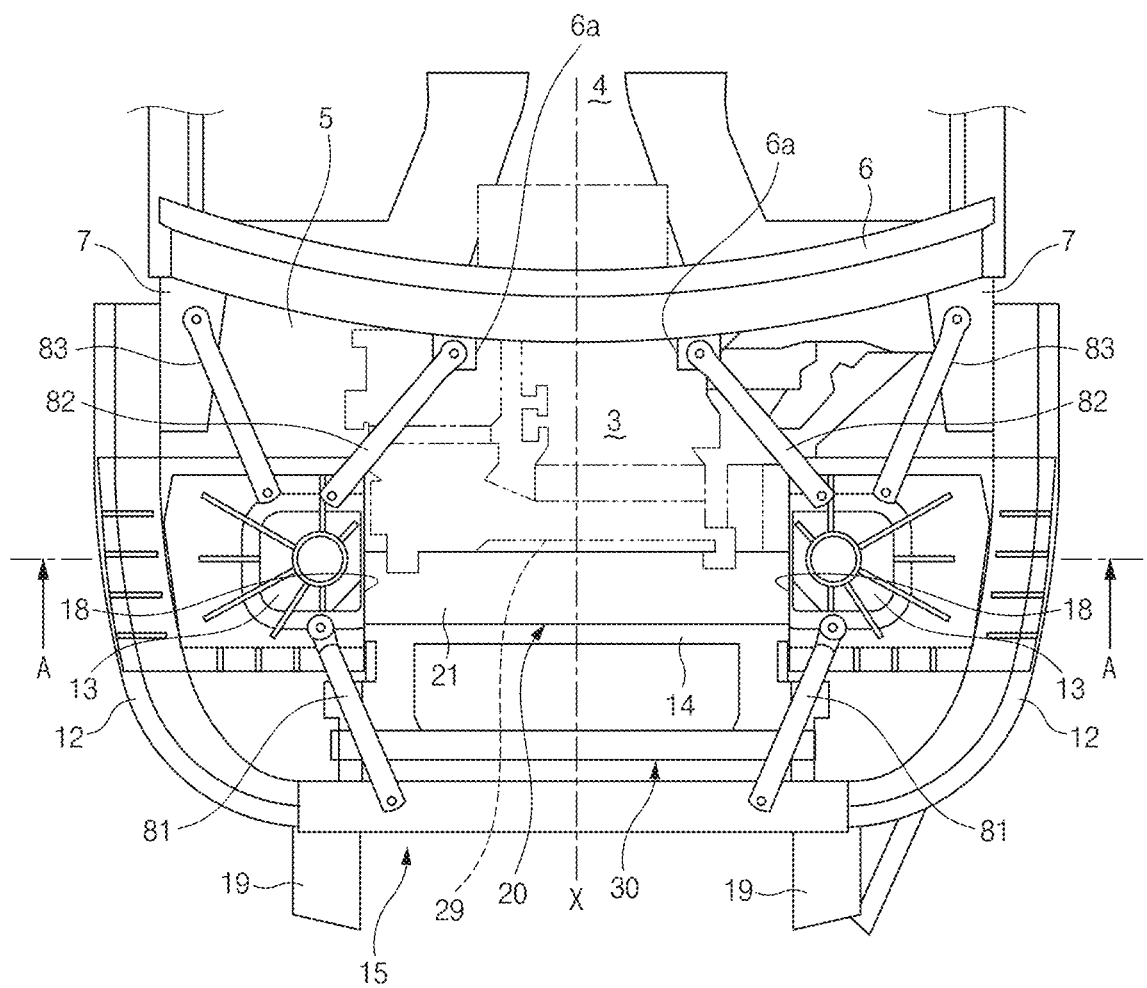
FIG. 2 illustrates a plan view of a vehicle front structure according to an embodiment of the present disclosure.

Referring to FIG. 2, the front end module 15 may be located in front of the pair of damper housings 13, and a pair of first stiffness bars 81 may connect the pair of damper housings 13 and the front end module 15. The pair of first stiffness bars 81 may be arranged symmetrically with respect to the central longitudinal axis X of the vehicle. One end of each first stiffness bar 81 may be connected to a front edge of the corresponding damper housing 13 by using fasteners, welding, and/or the like. The other end of the first stiffness bar 81 may be connected to the front end module 15 by using fasteners, welding, and/or the like.

Referring to FIG. 2, the cowl 6 may be located behind the pair of damper housings 13, and a pair of second stiffness bars 82 may connect the pair of damper housings 13 and the cowl 6. The pair of second stiffness bars 82 may be arranged symmetrically with respect to the central longitudinal axis X of the vehicle. One end of each second stiffness bar 82 may be connected to the corresponding damper housing 13 by using fasteners, welding, and/or the like. The other end of the second stiffness bar 82 may be connected to the cowl 6 by using fasteners, welding, and/or the like. The cowl 6 may have a pair of mounting brackets 6a, and the other end of the second stiffness bar 82 may be connected to the corresponding mounting bracket 6a of the cowl 6.

Referring to FIG. 2, a pair of third stiffness bars 83 may connect the pair of damper housings 13 and the dash panel 5, and the pair of third stiffness bars 83 may be arranged symmetrically with respect to the central longitudinal axis X of the vehicle. One end of each third stiffness bar 83 may be connected to the corresponding damper housing 13 by using fasteners, welding, and/or the like. The other end of the third stiffness bar 83 may be connected to the dash panel 5 by using fasteners, welding, and/or the like. The dash panel 5 may have a pair of support portions 7 extending from a pair of edges thereof toward the front of the vehicle, respectively. The other end of the third stiffness bar 83 may be connected to the corresponding support portion 7 of the dash panel 5.

Figure 10:
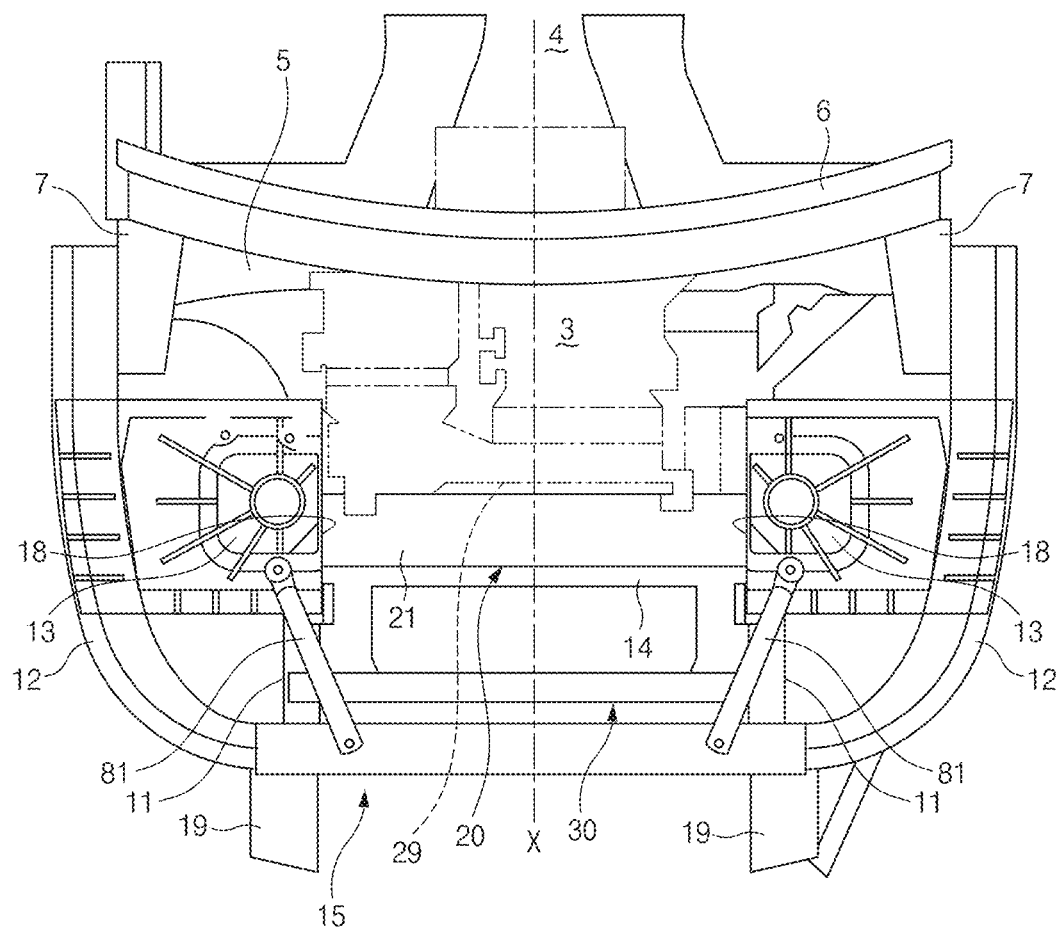
FIG. 10 illustrates a plan view of a vehicle front structure according to another embodiment of the present disclosure.

The vehicle front structure according to another embodiment may increase its transverse stiffness by the connection member 20, and the pair of second stiffness bars 82 and the pair of third stiffness bars 83 may be removed as illustrated in FIG. 10. This configuration may prevent the load from being transferred to the passenger compartment through the vehicle front structure, thereby improving noise, vibration, and harshness (NVH) performance. The configuration may provide a enough mounting space for a heating, ventilation, & air conditioning (HVAC) system 29 when the HVAC system 29 is mounted in the front compartment 3.

According to embodiments of the present disclosure, as the crossmember 21 connects the pair of damper housings 13, and the extension portions 22 are connected to the corresponding front side members 11, the pair of damper housings 13, the connection member 20, the pair of front side members 11, and the front subframe 30 may form the closed loop structure CL.

According to embodiments of the present disclosure, as the connection member 20 connects the pair of damper housings 13 and the pair of front side members 11, and the front subframe 30 is connected to the pair of front side members 11, the closed loop structure may be provided in the front compartment 3 so that the transverse stiffness of the vehicle front structure may be improved.

According to embodiments of the present disclosure, as the pair of damper housings 13 are connected to the crossmember 21 of the connection member 20 in the width direction of the vehicle, the load applied to the vehicle front structure may be uniformly transferred or distributed through the pair of damper housings 13.

According to embodiments of the present disclosure, as the pair of damper housings 13 are connected to the front side members 11 and the front subframe 30 through the connection member 20 in the closed loop, the damper housings 13 may be prevented from rotating on a vertical axis of the vehicle when the load is applied in the width direction (or lateral direction) of the vehicle. By preventing the pair of damper housings 13 from rotating, the mounting stiffness of each damper may be improved, and accordingly ride and handling (R&H) and steering response may be improved.

According to embodiments of the present disclosure, as the crossmember 21 and the pair of extension portions 22 of the connection member 20 form a unitary one-piece structure, assembly tolerance of the connection member 20 may be reduced.

Hereinabove, although the present disclosure has been described with reference to specific embodiments and the accompanying drawings, the present disclosure is not limited thereto. The embodiments may be variously modified and altered by those having ordinary skill in the art to which the present disclosure pertains without departing from the spirit and scope of the present disclosure claimed in the following claims.

What is claimed is:

1. A vehicle front structure, comprising:
    a pair of front side members disposed on the front of the vehicle;
    a pair of damper housings connected to the pair of front side members, respectively; and
    a connection member connecting the pair of front side members and the pair of damper housings.

2. The vehicle front structure according to claim 1, wherein the connection member includes:
    a crossmember extending in a width direction of the vehicle; and
    a pair of extension portions extending from the crossmember toward the pair of front side members, respectively.

3. The vehicle front structure according to claim 2, wherein each damper housing has a mounting cavity in which an end portion of the crossmember is received, and
    wherein the end portion of the crossmember is connected to the mounting cavity.

4. The vehicle front structure according to claim 2, wherein each extension portion extends diagonally from the crossmember toward a corresponding front side member.

5. The vehicle front structure according to claim 2, wherein each extension portion has a mounting surface connected to an inboard-side surface of a corresponding front side member.

6. The vehicle front structure according to claim 2, further comprising a front subframe disposed below the pair of front side members,
    wherein the front subframe has a pair of attachment arms connected to the pair of front side members, respectively, and
    wherein each attachment arm is aligned with a corresponding extension portion in a height direction of the vehicle.

7. The vehicle front structure according to claim 2, wherein the crossmember and each extension portion have a closed transverse cross section.

8. The vehicle front structure according to claim 2, wherein the crossmember and each extension portion have an I-shaped cross section.

9. The vehicle front structure according to claim 8, wherein the connection member further includes a plurality of first ribs attached to the crossmember and a plurality of second ribs attached to the extension portion.

10. The vehicle front structure according to claim 1, further comprising:
    a front end module located in front of the pair of damper housings; and
    a pair of first stiffness bars connecting the pair of damper housings and the front end module.

11. The vehicle front structure according to claim 1, further comprising:

a cowl located behind the pair of damper housings; and a pair of second stiffness bars connecting the pair of damper housings and the cowl.

12. The vehicle front structure according to claim 1, wherein the connection member connects the pair of damper housings in a width direction of the vehicle, and the connection member connects each damper housing and a corresponding front side member in a height direction of the vehicle.

* * * * *